(12) United States Patent
Higgs

(10) Patent No.: US 9,716,904 B2
(45) Date of Patent: Jul. 25, 2017

(54) VIDEO CONTENT PRESENTATION OVERRIDE CONTROL SYSTEMS, METHODS AND DEVICES

(75) Inventor: Paul Higgs, Roswell, GA (US)

(73) Assignee: ERICSSON AB, Stockholm (SE)

( * ) Notice: Subject to any disclaimer, the term of this patent is extended or adjusted under 35 U.S.C. 154(b) by 948 days.

(21) Appl. No.: 13/474,357

(22) Filed: May 17, 2012

(65) Prior Publication Data

US 2013/0312052 A1     Nov. 21, 2013

(51) Int. Cl.
| | | |
|---|---|---|
| *H04N 7/173* | (2011.01) | |
| *H04N 21/2362* | (2011.01) | |
| *H04N 21/434* | (2011.01) | |
| *H04N 21/454* | (2011.01) | |
| *H04N 21/6332* | (2011.01) | |
| *H04N 21/845* | (2011.01) | |
| *H04N 21/6547* | (2011.01) | |

(52) U.S. Cl.
CPC ..... *H04N 21/2362* (2013.01); *H04N 21/4345* (2013.01); *H04N 21/454* (2013.01); *H04N 21/6332* (2013.01); *H04N 21/6547* (2013.01); *H04N 21/8453* (2013.01)

(58) Field of Classification Search
USPC .................................................. 725/25, 131
See application file for complete search history.

(56) References Cited

U.S. PATENT DOCUMENTS

| 7,027,101 B1 | 4/2006 | Sloo et al. | |
| 2008/0267588 A1* | 10/2008 | Iwase et al. | 386/108 |
| 2013/0155186 A1* | 6/2013 | Lee et al. | 348/43 |

FOREIGN PATENT DOCUMENTS

EP     2076027 A1     7/2009

OTHER PUBLICATIONS

Anonymous: "ATSC Standards"; Wikipedia, the free encyclopedia, retrieved Apr. 2, 2012, http://en.wikipedia.org/w/index.php?title=ATSC_standards&printable=yes.
Anonymous: "Digital Video Broadcasting"; Wikipedia, the free encyclopedia, retrieved Apr. 2, 2012; http://en.wikipedia.org/w/index.php?title=Digital_Video_Broadcasting&printable=yes.
Anonymous: "Smart TV"; Wikipedia, the free encyclopedia, retrieved Apr. 2, 2012; http://en.wikipedia.org/w/index.php?title=Smart_TV&printable=yes.

* cited by examiner

*Primary Examiner* — Jivka Rabovianski

(57) ABSTRACT

A video content presentation terminal includes a video content receiver that is configured to receive video content and presentation override controls for the video content. The presentation override controls define presentation restrictions for the video content. The video content presentation terminal also includes an applications processor that is configured to execute applications on the video content presentation terminal. The applications include presentation format requests. The video content presentation terminal also includes a controller that is responsive to the video content receiver and the applications processor. The controller is configured to format the content that was received for presentation on a content presentation device according to the presentation override controls that were received, while preventing implementation of the presentation format requests that are made by the applications that are inconsistent with the presentation override controls. Related systems, methods and devices are described.

17 Claims, 6 Drawing Sheets

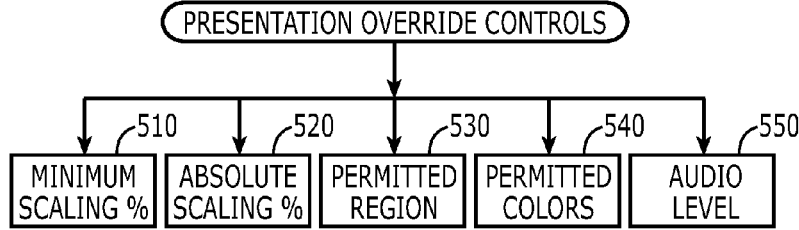

FIG. 5

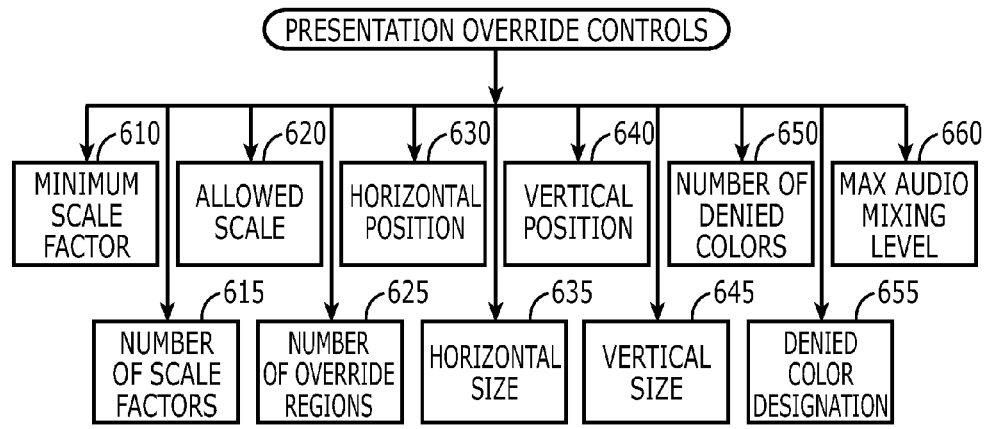

FIG. 6

| Syntax | Number of bits | Identifier |
|---|---|---|
| presentation_override_controls_descriptor() { | | |
|     descriptor_tag | 8 | uimsbf |
|     descriptor_length | 8 | uimsbf |
|     minimum_scale | 8 | uimsbf |
|     num_scales | 6 | uimsbf |
|     for (i=0; i<num_scales; i++) { | | |
|         allowed_scale | 7 | uimsbf |
|     } | | |
|     num_regions | 6 | uimsbf |
|     for (i=0; i<num_regions; i++) { | | |
|         overlay_region_position_horizontal | 7 | uimsbf |
|         overlay_region_size_horizontal | 7 | uimsbf |
|         overlay_region_position_vertical | 7 | uimsbf |
|         overlay_region_size_vertical | 7 | uimsbf |
|     } | | |
|     num_colors | 8 | uimsbf |
|     for (i=0; i<num_colors; i++) { | | |
|         denied_color | 24 | uimsbf |
|     } | | |
|     maximum_application_audio_mix | 7 | uimsbf |
| } | | |

FIG. 7

VIDEO CONTENT PRESENTATION OVERRIDE CONTROL SYSTEMS, METHODS AND DEVICES

TECHNICAL FIELD

Various embodiments described herein relate to digital communications and, more particularly, to digital video content broadcasting, digital video content delivery and presentation systems, methods and devices.

BACKGROUND

Digital video broadcasting, such as digital television (TV) broadcasting, has largely replaced analog video broadcasting. For example, in North America, a set of standards developed by the Advanced Television Systems Committee (ATSC) is being used for digital television transmission over terrestrial, cable and satellite networks. In Europe and other countries, Digital Video Broadcasting (DVB) has provided a suite of open standards for digital television. These standards may define the physical layer and the data link layer of a video content distribution system. The data may be transmitted in Moving Picture Expert Group (MPEG)-2 transport streams, International Standards Organization (ISO) Base Media (BM), MPEG-4 file formats and/or other transport streams or delivery formats.

Concurrent with the development of digital TV broadcasting, a new type of TV device, referred to as a "smart TV" and also sometimes referred to as a "connected TV" or a "hybrid TV", has been developed. Smart TV devices can integrate Internet and Web 2.0 features into modern television sets and set-top boxes, as well as enhance the technological convergence between computers and these television sets/set-top boxes. Smart TV devices can have a higher focus on online interactive media, Internet TV, over-the-top content, as well as on-demand streaming media, and may have less focus on traditional broadcast media. The technology that enables smart TVs may be incorporated into television sets, but also into companion devices, such as set-top boxes, Blu-ray players, game consoles, hotel television systems and/or other companion devices. These devices may, for example, allow viewers to search and find videos, movies, photos and other content on the Web, on a local cable TV channel, on a satellite TV channel and/or stored on a local hard drive.

The approaches described in this section could be pursued, but are not necessarily approaches that have been previously conceived or pursued. Therefore, unless otherwise indicated herein, the approaches described in this section are not prior art to claims in this application and any application claiming priority from this application, and are not admitted to be prior art by inclusion of this section.

SUMMARY

Various embodiments described herein provide a video content presentation terminal that includes a video content receiver that is configured to receive video content and presentation override controls for the video content. The presentation override controls define presentation restrictions for the video content. The video content presentation terminal also includes an applications processor that is configured to execute applications on the video content presentation terminal. The applications include presentation format requests. The video content presentation terminal also includes a controller that is responsive to the video content receiver and the applications processor. The controller is configured to format the video content that was received for presentation on a content presentation device according to the presentation override controls that were received, while preventing implementation of the presentation format requests that are made by the applications that are executing on the video content presentation terminal that are inconsistent with the presentation override controls.

In some embodiments, the video content receiver is configured to receive the presentation override controls for the video content in an in-band field of the video content. As used herein, the term "in-band" means as part of a content stream, as opposed to separate from the content stream. Thus, in-band presentation override controls may be delivered as part of a content stream under a broadcast standard, whereas "out-of-band" presentation override controls may be delivered using, for example, a separate Internet connection or a cable, satellite and/or terrestrial connection at a different time than when the content is broadcast.

Various embodiments of presentation override controls may be provided according to various embodiments described herein. In some embodiments, presentation override controls comprise an identification of a minimum percentage to which the video content can be scaled on the video presentation device; an identification of an absolute scaling percentage to which the video content can be scaled on the video presentation device; an identification of a permitted region of the video presentation device on which the applications can overlay applications graphics or content; an identification of a color that cannot be used on the content presentation device to present applications graphics or content in regions made available on the content presentation device; and/or an identification of a level of audio that can be mixed into an audio output of the content presentation device. It will be understood that various combinations and subcombinations of these and/or other presentation override controls may be used.

Moreover, in other embodiments, the presentation override controls can comprise an identification of a minimum scale factor; an identification of a number of scale factors; an identification of an allowed scale; an identification of a number of overlay regions; an identification of an overlay region horizontal position; an identification of an overlay region horizontal size; an identification of an overlay region vertical size; an identification of an overlay region vertical position; an identification of a number of denied colors for an overlay region; an identification of a designation of a denied color in an overlay region; and/or an identification of a maximum audio mixing level; for presentation of the content that was received on the content presentation device. It will be understood that various combinations and subcombinations of these and/or other presentation override controls may be used.

In some embodiments, the video content receiver is configured to receive the presentation override controls in an in-band presentation override control field that accompanies the video content. Moreover, in some embodiments, the controller is further configured to ignore presentation format requests that are made by the applications that are executing on the video content presentation terminal when the presentation control field does not contain a presentation override control.

Presentation override controls according to various embodiments described herein may be used with various digital video broadcasting standards. For example, in some embodiments, the receiver is configured to receive the video content as an advanced television systems committee stream, and the presentation override controls are included in an event information table of the advanced television systems committee stream, for example for each source that is identified in the event information table. In other embodiments, the receiver is configured to receive the video content as a digital video broadcasting stream, and the presentation override controls are included in an event information table of the digital video broadcasting stream. In still other embodiments, the receiver is configured to receive the video content as an international standards organization base media file format, and the presentation override controls are included in a video media header field of metadata of the international standards organization base media file format. In yet other embodiments, the receiver is configured to receive the video content as a moving picture experts group-2 transport stream, and the presentation override controls are included in a service information packet of the moving picture experts group-2 transport stream. In still other embodiments, the receiver is configured to receive the video content as a moving picture experts group-4 file format, and the presentation controls are included in a video media header field of metadata of the moving picture experts group-4 file format. It will be understood that various combinations and subcombinations of these and/or other presentation override controls may be used.

Although video content presentation terminals were described above, analogous video content presentation methods may be provided according to other embodiments described herein. These video content presentation methods may comprise receiving video content and presentation override controls for the video content, the presentation override controls defining presentation restrictions for the video content; executing applications including presentation format requests; and formatting the content that was received for presentation on a content presentation device according to the presentation override controls that were received, while preventing implementation of the presentation format requests that are made by the applications that are inconsistent with the presentation override controls. Embodiments of presentation override controls and presentation override controls according to various digital video broadcast standards may also be provided, as was described above.

Other embodiments described herein can provide video content broadcast systems. These video content broadcast systems include a video content receiver that is configured to receive video content and presentation override controls for the video content. The presentation override controls define presentation restrictions for presentation of the video content on a content presentation device, while preventing implementation of presentation format requests that are made by applications that are executing on a video content presentation terminal that is associated with the content presentation device, that are inconsistent with the presentation override controls. A video content broadcaster is configured to broadcast the video content and the presentation override controls for the video content. In some embodiments, the video content broadcast system is configured to broadcast the video content and the presentation override controls for the video content in an in-band field of the video content. Embodiments of presentation override controls and presentation override controls according to various digital video broadcast standards may also be provided, as was described above. Moreover, analogous video content broadcast methods may also be provided according to various embodiments described herein.

Various other embodiments described herein can provide a nontransitory computer-readable medium containing a video content broadcast signal. The video content broadcast signal comprises video content and presentation override controls for the video content. The presentation override controls define presentation restrictions for presentation of the video content on a content presentation device, while preventing implementation of presentation format requests that are made by applications that are executing on a video content presentation terminal that is associated with the content presentation device, that are inconsistent with the presentation override controls. Stated differently, the presentation override controls are used to prevent the applications from implementing presentation format requests that are inconsistent with the presentation override controls. The presentation override controls may be included in an in-band field of the video content. Moreover, embodiments of presentation override controls and presentation override controls according to various digital video broadcast standards may also be provided, as was described above.

BRIEF DESCRIPTION OF THE DRAWINGS

FIG. 5 is a flowchart of presentation override controls according to various embodiments described herein.

FIG. 6 is a flowchart of other embodiments of presentation override controls according to various embodiments described herein.

FIG. 7 is a table illustrating data descriptor syntaxes for presentation override controls according to various embodiments described herein.

DETAILED DESCRIPTION

Various embodiments described herein may arise from recognition that smart TV technology can provide applications with a great degree of flexibility in displaying Internet and Web 2.0 features along with video content. Thus, a user may be watching a television program, video or movie on a smart TV, while also allowing applications that run on the smart TV to provide a display of weather, news, stocks, social networking information, Web search information, shopping information, etc. This allows great flexibility on the part of the user. However, this flexibility may occur at the expense of corrupting the appearance of the television program, video or movie content that was provided by a content provider or owner. Various embodiments described herein can allow the content provider to include presentation override controls that define presentation restrictions for the video content. Thus, although smart TV features may be allowed, the content provider may assure that the smart TV features do not unduly corrupt the appearance of the content that is being provided.

Figure 1:
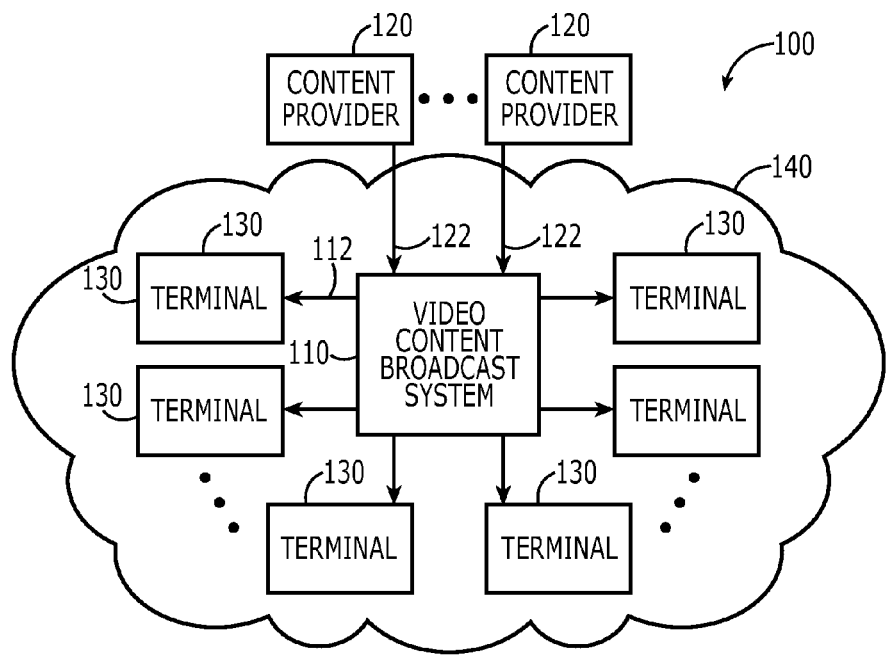
FIG. 1 is a block diagram of video content broadcast systems, methods and devices that include video presentation override controls according to various embodiments described herein.

FIG. 1 is a block diagram of systems, methods and devices according to various embodiments described herein. These systems, methods and devices 100 include a video content broadcast system 110, one or more content providers 120 and a large number of video content presentation terminals (also referred to herein simply as "terminals") 130. In some of these systems, methods and devices 100, video content is transmitted to the terminals along with presentation override controls that define presentation restrictions for the video content. The presentation override controls are used to format the content for presentation on a content presentation device that is associated with the terminal, notwithstanding presentation format requests that are made by applications that are executing on the terminal that are inconsistent with the presentation override controls. Stated differently, the presentation override controls are used to prevent applications from implementing presentation format requests that are inconsistent with the presentation override controls.

More specifically, referring to FIG. 1, one or more content providers provide digital video content 122 in the form of television (TV) programs, movies, videos, advertisements and/or other digital video content. It will be understood that the digital video content may also include digital audio content. The content providers 120 may be movie studios, television studios, a video sharing website such as YouTube, and/or other video content providers.

The video content 122 may be provided to the video content broadcast system 110 in a format that is ready for broadcasting. Alternatively, the content providers 120 may provide the video content in various formats and/or media that are not ready for broadcasting. In some embodiments, the video content 122 may include embedded presentation override controls for the video content, wherein the presentation override controls define presentation restrictions for presentation of the video content on a video content presentation device, notwithstanding presentation format requests that are made by applications that are executing on a video content presentation terminal that is associated with the content presentation device, that are inconsistent with the presentation override controls. Stated differently, the presentation override controls are used to prevent applications from implementing presentation format requests that are inconsistent with the presentation override controls.

The content 122 that is provided may include therein embedded presentation override controls. Alternatively, the content may only include instructions for presentation override controls, but the controls themselves may be inserted by the video content broadcast system 110. In other embodiments, the desired presentation override controls or instructions may be provided by the content provider 120 separate from the content 122 itself and/or the override controls may be generated by or for the video content broadcast system 110.

The video content broadcast system 110 may include a terrestrial, cable, satellite and/or Internet-based broadcasting system that broadcasts video content 122 to a plurality of video content presentation terminals 130 over a network 140, which may be a terrestrial, cable, satellite and/or Internet network that uses wired and/or wireless connections. The video content broadcast system 110 may aggregate content from various content providers 120 and may also provide various other subscriber services, such as electronic program guides, billing, advertising, etc. The video content broadcast system 110 is configured to receive video content and presentation override controls for the video content. The presentation override controls may be received from a content provider 120, and/or may be generated by or for the video content broadcast system 110. The presentation override controls define presentation restrictions for presentation of the video content on a content presentation device that is associated with the video content presentation terminal 130, notwithstanding presentation format requests that are made by applications that are executing on the video content presentation terminal 130 that are inconsistent with the presentation override controls. Stated differently, the presentation override controls are used to prevent implementing presentation format requests that are inconsistent with the presentation override controls. The video content broadcast system 110 is also configured to broadcast the video content and the presentation override controls to the terminals 130.

The video content presentation terminal 130 is configured to receive a stream 112 of video content, that may also include presentation override controls for the video content, and to also execute applications that include presentation format requests. The video content presentation terminal 130 is also configured to format the content that is received for presentation on a content presentation device, which may be included in the same housing as the video content presentation terminal 130 or which may be otherwise associated therewith. The content is formatted according to the presentation override controls that are received, notwithstanding the presentation format requests that are made by the applications that are executing on the video content presentation terminal 130 that are inconsistent with the presentation override controls.

Figure 2:
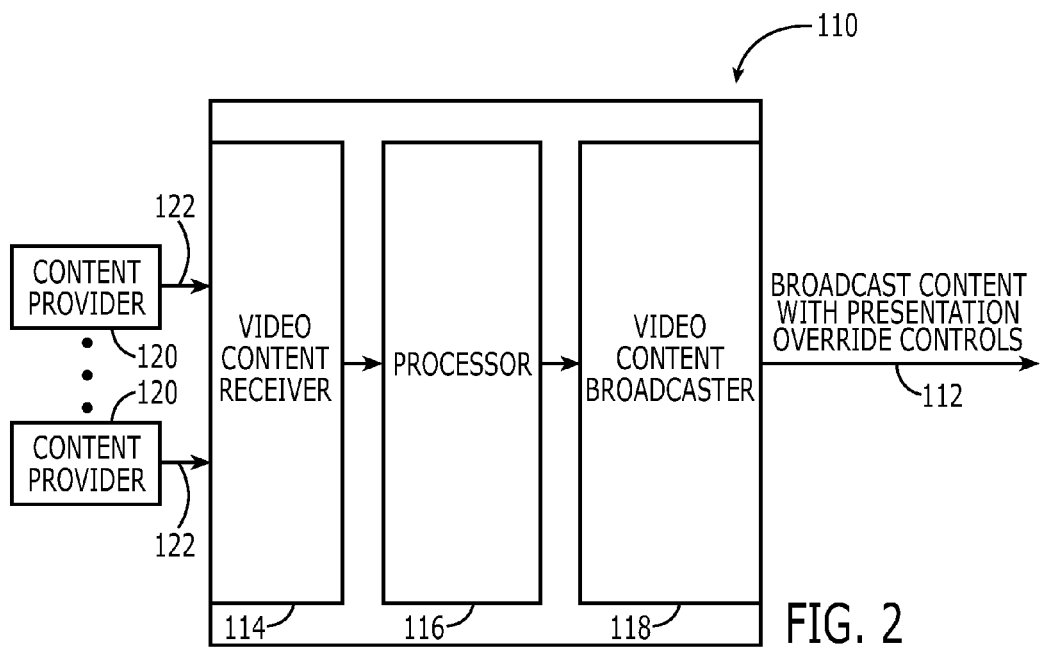
FIG. 2 is a block diagram of a broadcast system and method according to various embodiments described herein.

FIG. 2 is a detailed block diagram of a video content broadcast system, such as the video content broadcast system 110 of FIG. 1. Referring now to FIG. 2, the video content broadcast system 110 includes a video content receiver 114 that is configured to receive video content 122 and presentation override controls, the presentation override controls defining presentation restrictions for presentation of the video content on a content presentation device, notwithstanding presentation format requests that are made by applications that are executing on the video content presentation terminal that are inconsistent with the presentation override controls. Stated differently, the presentation override controls are used to prevent implementing presentation format requests that are inconsistent with the presentation override controls. As was described above, the content provider 120 may provide the video content along with the presentation override controls embedded therein in a single stream. Alternatively, the video content provider 120 may provide the presentation override controls separately from the content. In another alternative, the video content receiver 114 may receive the presentation override controls from a source that is different from the content provider, for example from another source within the video content broadcast system 110 or from another external source.

The video content broadcast system 110 also includes a processor 116 that is configured to aggregate content from the various content providers 120, to embed the presentation override controls if needed, and to provide other services. The processor 116 may be embodied by one or more enterprise, application, personal or pervasive computer systems that may stand-alone or interconnected by a wired and/or wireless network.

Finally, a video content broadcaster 118 is provided that is configured to broadcast a stream 112 that includes the video content, and in some embodiments also includes the presentation override controls for the video content, using the appropriate terrestrial, cable, satellite and/or Internet protocols. The presentation override controls may be broadcast in-band or out-of-band with the content. In-band presentation override controls can make it difficult for an application or user to disable the presentation override controls and may ensure that the content presentation override controls remain if the content is recorded and later played back. In contrast, out-of-band presentation override controls may be more easily disabled, for example by disabling the IP connection that provides the out-of-band override controls. It will also be understood that the video content receiver 114, the processor 116 and/or the video content broadcaster 118 may be embodied in the same or different circuits.

Figure 3:
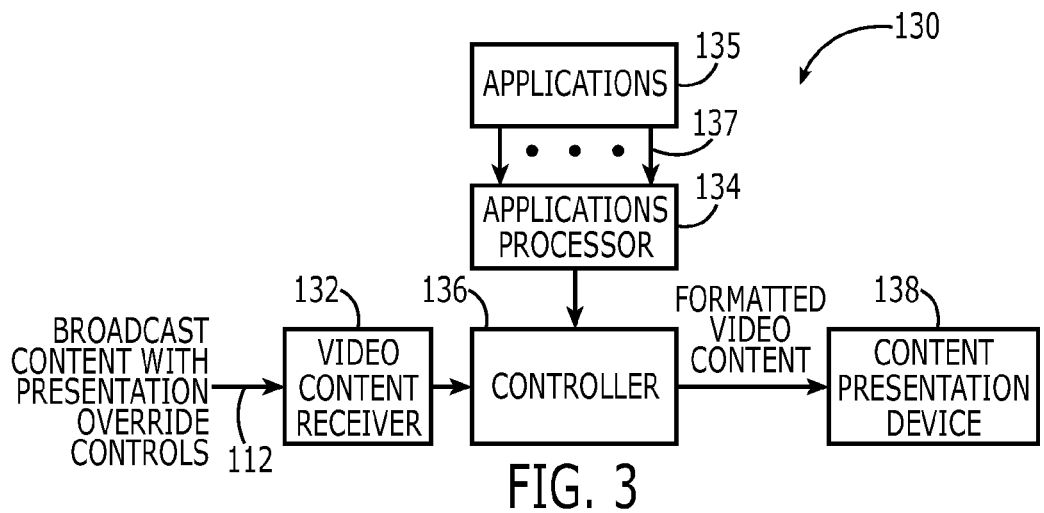
FIG. 3 is a block diagram of a video content presentation terminal according to various embodiments described herein.

FIG. 3 is a block diagram of a video content presentation terminal, such as the video content presentation terminal 130 of FIG. 1. The video content presentation terminal 130 may be embodied as a television, a smart TV, a media player, a personal computer (including desktop, notebook and/or tablet computers), a smart phone, a set-top box, Blu-ray player, game console, hotel television system and/or other companion devices.

More specifically, referring to FIG. 3, the video content presentation terminal 130 includes a video content receiver 132 that is configured to receive a stream 112 of video content, and in some embodiments presentation override controls, the presentation override controls defining presentation restrictions for the video content. An applications processor 134 is also included that is configured to execute applications 135 on the video content presentation terminal 130, the applications including presentation format requests 137. These applications 135 may be native to the video content presentation terminal 130 and/or may be downloaded from an outside source, such as the Internet. These applications may include a display of weather, news, stocks, social networking information, Web search information, shopping information, etc. Since these applications 135 may ultimately provide a presentation on a content presentation device 138 that is associated with a video content presentation terminal 130, these applications typically will include presentation format requests 137 for formatting the presentation of the application 135 on the content presentation device 138.

A controller 136 is also included in the video content presentation terminal 130. The controller is responsive to the video content receiver 132 and to the applications processor 134 and is configured to format the content that was received for presentation on a content presentation device 138 according to the presentation override controls that were received, notwithstanding the presentation format requests 137 that are made by the applications 135 that are executing on the video content presentation terminal 130 that are inconsistent with the presentation override controls. Stated differently, the controller is configured to prevent the applications from implementing presentation format requests that are inconsistent with the presentation override controls. Finally, a content presentation device 138, such as an audio/visual computer display or a TV display, may be included within the same housing as the remaining components of the video content presentation terminal 130 or in a freestanding housing. The applications 135, the applications processor 134, the video content receiver 132, the controller 136 and/or the content presentation device 138 may be embodied in the same or different circuits in the same or different devices.

Figure 4:
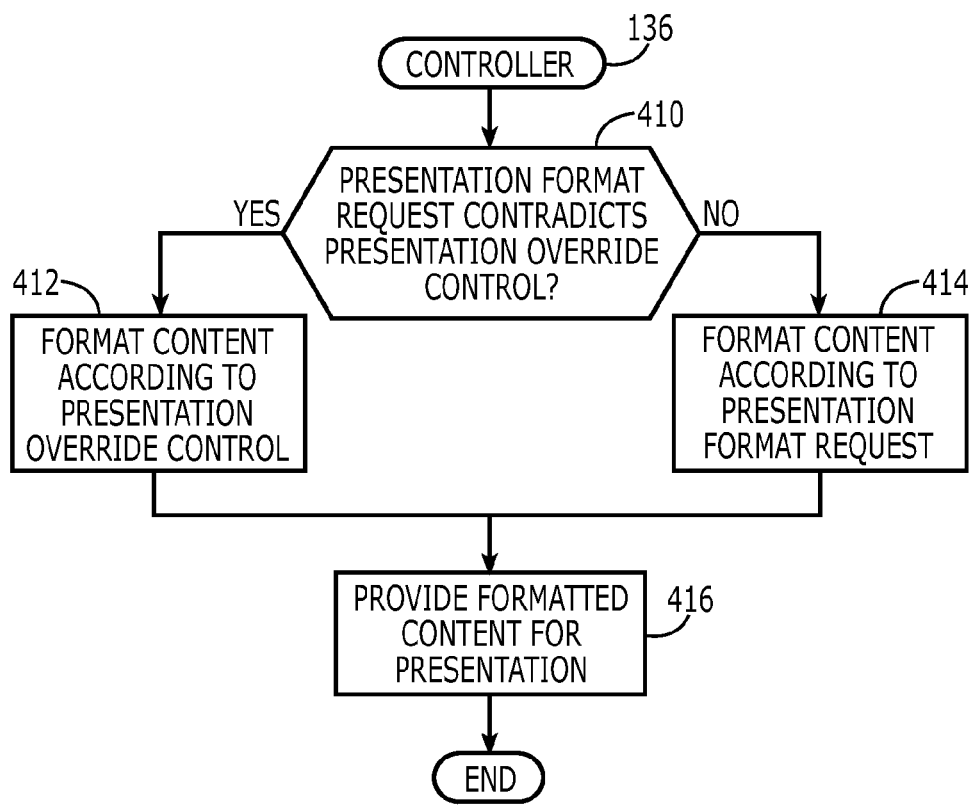
FIG. 4 is a flowchart of operations that may be performed by a controller of a video content presentation terminal according to various embodiments described herein.

FIG. 4 is a block diagram of operations that may be performed by a controller, such as the controller 136 of FIG. 3. As shown in FIG. 4, a determination is made at Block 410 as to whether the presentation format request that is generated by an application, such as an application 135 of FIG. 3, contradicts a presentation override control that is received in or separate from the stream 112 of FIG. 3. If "YES", then the content is formatted according to the presentation override control at Block 412. If "NO", the content is formatted according to the presentation format request that is provided by the application at Block 414. The formatted content is then provided for presentation at Block 416, for example on the content presentation device 138 of FIG. 3.

Additional discussion of various embodiments of FIGS. 1-4 will now be provided. Specifically, currently available television sets have the ability to run applications created by the television set manufacturer and/or by third parties. These applications could scale the video content being received to a small window and use the rest of the display area for other information. Perhaps even more intrusively, an application can open an area of the graphics plane (the layer of the screen display where non-video content is presented, which is normally hidden when a full screen program is shown) and draw/write over the video content.

Current mechanisms for providing programming for television services rely on various legal agreements and contracts between terminal providers (for example, set-top box, Blu-ray player, game console, media player, hotel TV system and/or other device type providers), broadcasters and content owners to ensure that the program material is presented in a suitable manner. However, with the increasing variety of smart TVs and the capabilities of those terminals, it becomes possible for the terminal (either directly or through applications on that terminal) to alter the appearance of the video content in violation of the legal agreements and/or in violation of the content owner's desires.

Standards organizations do not appear to currently provide a technical mechanism (defined, for example, by DVB, ATSC or ISO) to ensure that the presentation of the video content is according to the expectation of the content owner or provider. There does not appear to be any technical activity (in the form of work items, discussions or contributions) in these groups to identify any such mechanism.

Various embodiments described herein can provide a mechanism for presentation override control information to be provided along with (or in some embodiments, separate from) the video content. The information is interpreted by the terminal to ensure that applications (either native to the terminal or from third parties) running on the terminal do not unduly adversely affect the original video content. By including this information in-band along with the video program content, its meaning can remain and be applied for content recorded on devices for future playback.

FIG. 5 illustrates presentation override controls according to various embodiments described herein. These presentation override controls may comprise an identification of a minimum percentage to which the video content can be scaled on the video presentation device (Block 510); an identification of zero, one or more absolute scaling percentages to which the video content can be scaled on the video presentation device (Block 520); an identification of zero, one or more permitted regions of the video presentation device on which the applications can overlay applications graphics or content (Block 530); an identification of zero, one or more colors that cannot be used on the content presentation device to present applications graphics or content in regions made available on the content presentation device (Block 540); and/or an identification of a level of audio that can be mixed into an audio output of the content presentation device (Block 550). It will be understood that various combinations and subcombinations of these and/or other presentation override controls may be used.

Accordingly, FIG. 5 illustrates various embodiments wherein additional information is to be carried in a new descriptive element (referred to as Presentation Override Controls) alongside the program content. This descriptive element defines presentation restrictions which are to be enforced by the terminal regardless of any application running on the terminal and requesting other capabilities. In some embodiments, absence of this descriptive element would indicate that the terminal (or application running on the terminal) is not permitted to alter the program in any way.

As shown in FIG. 5, the Program Override Controls may contain information such as:

Minimum percentage that the video content or program can be scaled to on the screen (Block 510). Thus, the terminal would not be allowed to scale the program to a size smaller than that provided by this value.

Zero, one or more permitted absolute scaling percentages that can be applied to the program (Block 520). That is, the terminal can only scale the program to one of the indicated sizes (for example, expressed as a percentage of the delivered program size).

Zero, one or more permitted regions that can be overlayed with other information (Block 530). That is, a list of those areas of the program, either in scaled or as shown in delivered size, which the terminal can present other graphics or programming on in order to ensure that areas of the program considered important to the content owner is respected.

Zero, one or more colors that cannot be used on areas made available by scaling the programming or in the overlay regions (Block 540). This can ensure that excessive visual emphasis is not taken away from the program content.

An indicator to express the level that audio produced by the terminal or applications running on that terminal can be mixed into the output (Block 550).

The descriptive element containing these values may be defined in ways that are suitable for carriage in MPEG-2 Transport Streams (as defined by DVB and ATSC) and MPEG-4 File Formats (as defined by ISO). The descriptive element may be attached to the service table, indicating that it is applicable to any program on that service/channel, or it could be attached to the event table indicating its applicability to the current program associated with the event.

EXAMPLES a. For a program that does not contain any Presentation Override Controls, any scaling of the program or drawing over portions of the screen by an application on the terminal is not permitted.

b. The program is delivered with Presentation Override Controls which only contains the minimum scaling size. Any attempt by an application to scale the program to a smaller size than this is not permitted.

c. The program is delivered with Presentation Override Controls which only allow scaling to 70%, 80% and 90% of the size of the delivered program. Any attempt by an application to scale the video to a size other than those specified would not be permitted.

d. The program is delivered with Presentation Override Controls that indicate an area of the program can be overlaid with information from an application. In some embodiments, the area is designated as being the lower-left area of the screen by specifying (h-start=0%, h-width=50%, v-start=90%, v-height=10%, this indicating that the lower 10% of the left half of the screen is available. The application would determine a coordinate system for this area based on the percentage values expressed in relation to the size of the program.

More detailed embodiments of presentation override controls according to various embodiments described herein, will now be described in connection with FIG. 6. Specifically, FIG. 6 illustrates presentation override controls according to various embodiments described herein that comprise an identification of a minimum scale factor (Block 610); an identification of a number of scale factors (Block 615); an identification of an allowed scale (Block 620); an identification of a number of overlay regions (Block 625); an identification of an overlay region horizontal position (Block 630); an identification of an overlay region horizontal size (Block 635); an identification of an overlay region vertical position (Block 640); an identification of an overlay region vertical size (Block 645); an identification of a number of denied colors for an overlay region (Block 650); an identification of a designation of a denied color in an overlay region (Block 655); and/or an identification of a maximum audio mixing level (Block 660); for presentation of the content that was received on the content presentation device. It will be understood that various combinations and subcombinations of these and/or other presentation override controls may be used.

FIG. 7 is a Table that includes field definitions to describe the information for the Presentation Override Controls descriptor in a format aligned with DVB specifications, according to various embodiments described herein. In these definitions, the data type is an unsigned integer, most significant bit first (uimsbf), so that an 8-bit control will have values of 0-255 and a 7-bit control will have values of 0-127. It will be understood that various combinations and subcombinations of these and/or other presentation override controls may be used.

The semantics for the program override controls data descriptors of FIG. 7 are as follows:

descriptor_tag and descriptor_length are fields defined to identify the descriptor format and are common to all defined descriptors.

minimum_scale (Block 610): This is an 8-bit value containing a 1-bit flag followed by a 7-bit data value. The 1-bit flag is carried in b7. When b7 is set to "1" it indicates that no minimum scale is specified and the remaining bits can be ignored. When b7 is set to "0" the remaining bits contain the minimum scale factor that can be applied to the content (if the value exceeds 100, the entire descriptor should be discarded).

num_scales (Block 615): This 6-bit field specifies the number of scale factors (in allowed_scale) that can be applied to the program. The 6-bit field allows up to 63 allowed_scale values to be provided.

allowed scale (Block 620): This is a 7-bit value which specifies a scaling factor that can be applied to the program. If any allowed_scale in the descriptor is greater than 100, the entire descriptor should be disregarded.

num_regions (Block 625): A 6-bit value specifying the number of regions that are defined for overlay in the program. This can be "0" to indicate that there are no areas of the program that can be overdrawn. The 6-bit field allows up to 63 overlay regions to be provided.

overlay_region_position_horizontal (Block 630) and overlay_region_size_horizontal (Block 635): These 7-bit values designate the horizontal starting position and size of an overlay region for the program. If the horizontal position is greater than "100" or the sum of these two values is greater than "100" the entire descriptor should be disregarded.

overlay_region_position_vertical (Block 640) and overlay_region_size_vertical (Block 645): These 7-bit values designate the vertical starting position and size of an overlay region for the program. If the vertical position is greater than "100" or the sum of these two values is greater than "100" the entire descriptor should be disregarded.

num_colors (Block 650): This 8-bit value specifies the number of colors in the denied list of colors that cannot be used in an overlay region or in the area made available when the program is scaled according to the minumim_scale or allowed_scale values.

denied_color (Block 655): A 24-bit value which designates a color, expressed, for example in component format, that cannot be drawn in an overlay region or in the area made available when the program is scaled according to the minumim_scale or allowed_scale values.

maximum_application_audio_mix (Block 660): Specifies the maximum mixing level for any audio/sound generated by the application. If this value exceeds "100" the entire descriptor should be discarded. A value of "0" indicates that no audio should be permitted by an application.

Figure 8:
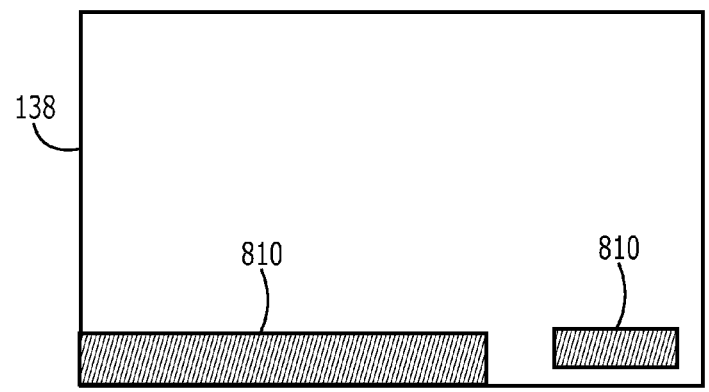
FIG. 8 illustrates a display of a video content presentation terminal that is subject to presentation override controls according to various embodiments described herein.

FIG. 8 illustrates a specific example as hatched regions 810 on a content presentation device (display) 138. The hatched regions 810 provide the allowable overlay regions when two regions are defined as:

(overlay_region_position_horizontal=85, overlay_region_size_horizontal=10, overlay_region_position_vertical=90, overlay_region_size_vertical=5) and (overlay_region_position_horizontal=0, overlay_region_size_horizontal=70, overlay_region_position_vertical=90, overlay_region_size_vertical=10).

Various embodiments described herein may be implemented in the Advanced Television Systems Committee (ATSC), Digital Video Broadcasting (DVB), Moving Picture Expert Group-2 (MPEG-2) or Moving Picture Expert Group-4 (MPEG-4) environments. Example implementations for each of these environments will now be described. It will be understood that various combinations and subcombinations of these and/or other presentation override controls may be used.

Figure 9:
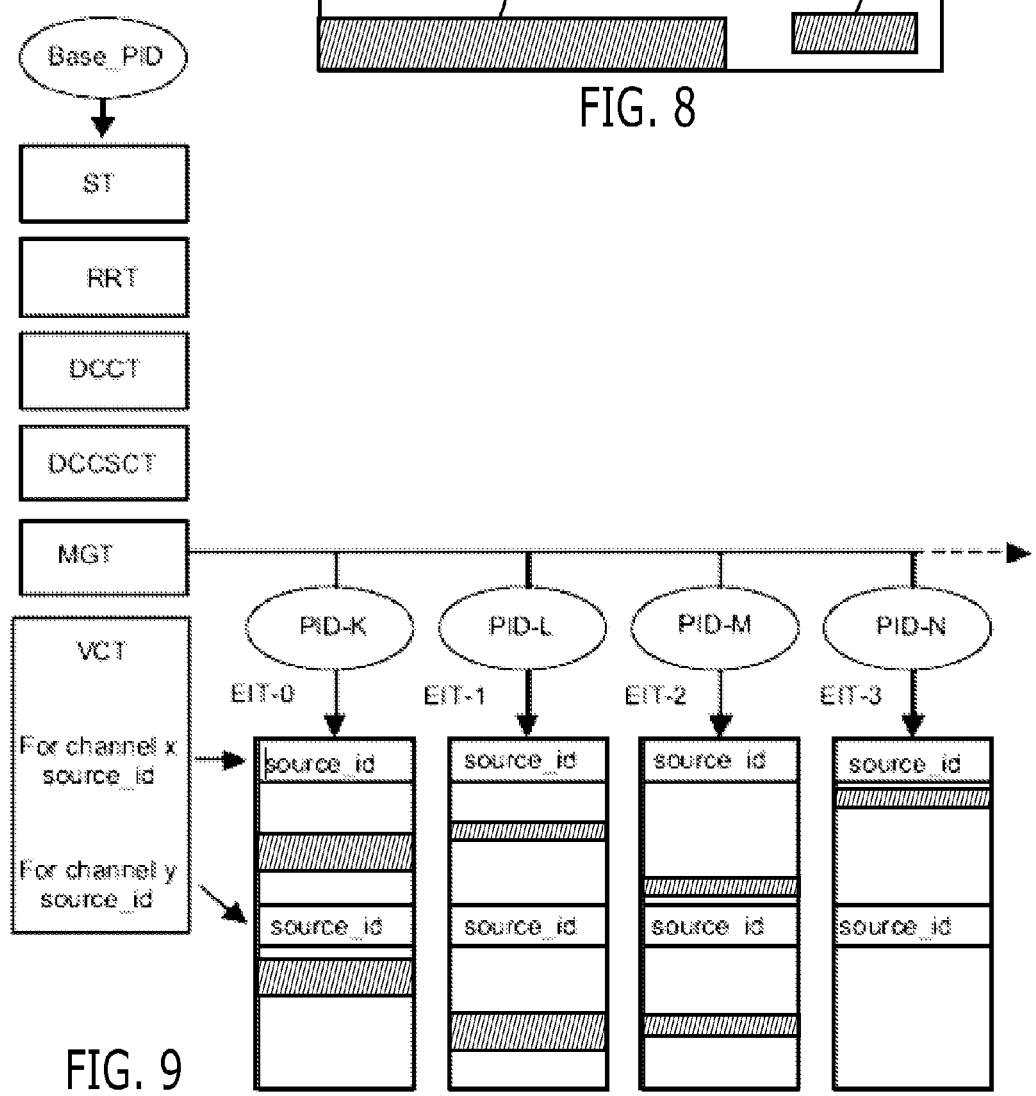
FIG. 9 illustrates an Advanced Television Systems Committee (ATSC) format that includes presentation override controls according to various embodiments described herein.

FIG. 9 illustrates an implementation in an ATSC environment according to ATSC A/65:2009, Program and System Information Protocol for Terrestrial Broadcast and Cable (PSIP). As will be described in detail, FIG. 9 illustrates presentation override controls that are included in an event information table of the ATSC stream, for example, included with each source identified in the event information table of the ATSC stream. In regard to carrying the presentation restriction controls in ATSC, one technique may be similar to that defined by the rc_descriptor defined in ATSC A/65: 2009 section 6.9.12.

FIG. 9, captured from ATSC A/65:2009, represents the EIT (Event Information Table) structure where the presentation restriction controls would be placed (i.e. those empty areas under each "source_id"). The hatched boxes represent the presentation controls descriptor. EIT information is given with the programming and contains title, start time, etc. (See ATSC A/65:2009 section 6.5.) It will be understood that various combinations and subcombinations of these and/or other presentation override controls may be used.

Figure 10:
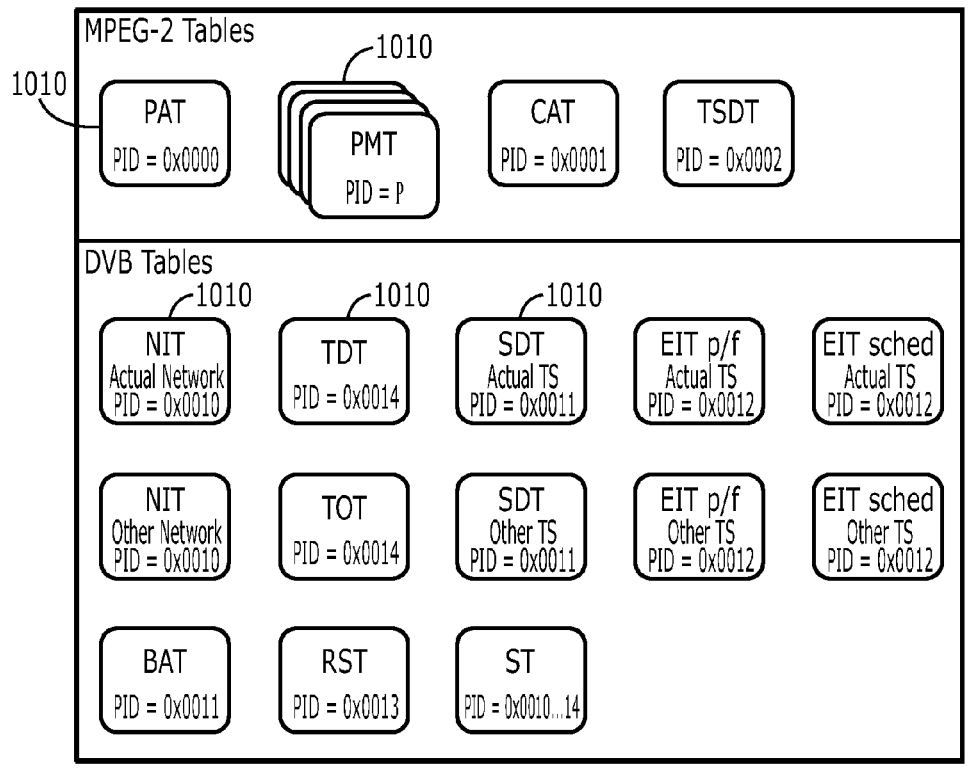
FIG. 10 illustrates a Digital Video Broadcasting (DVB) stream format that includes presentation override controls according to various embodiments described herein.

FIG. 10 illustrates an implementation in the DVB standard, and specifically illustrates the presentation override controls being included in an existing control table provided with a digital video broadcasting stream. Mandatory tables are labeled 1010 and the remaining tables are optional. Specifically, referring to FIG. 10, the presentation restriction controls descriptor is carried in the DVB Event Information Table (EIT) which is defined in ETSI EN 300 468 v. 1.12.1, Digital Video Broadcasting (DVB); Specification for Service Information (SI) in DVB systems, section 5.2.4. This standard does not offer any detailed diagram which depicts the table hierarchy down to the EIT, but does give the diagram reproduced in FIG. 10. In some embodiments, the presentation restriction controls descriptor would be carried as a descriptor( ) in Table 7 of this standard and can be comprehensively documented in either section 6.2 of section 6.4. It will be understood that various combinations and subcombinations of these and/or other presentation override controls may be used.

Figure 11:
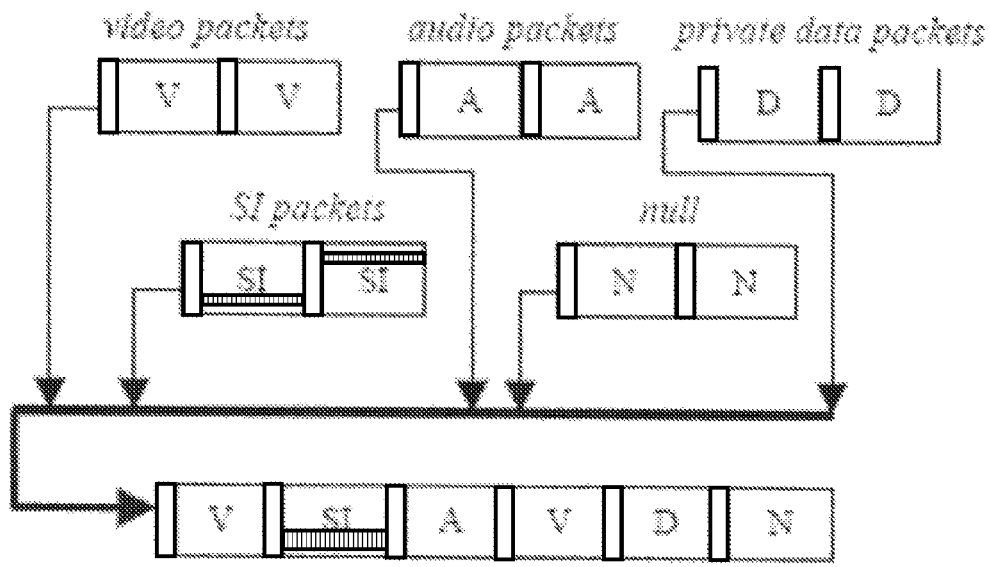
FIG. 11 illustrates a Moving Picture Expert Group-2 (MPEG-2) transport stream format that includes presentation override controls according to various embodiments described herein.

FIG. 11 is taken from http://lib.tkk.fi/Diss/2002/isbn9512261723/article1.pdf) and represents the presentation restriction controls descriptor as a hatched box, prepared as part of the SI (Service Information) and incorporated into the delivered MPEG-2 transport stream. See ISO IEC 13818-1, Information technology—Generic Coding of Moving Pictures and Associated Audio Recommendation H.222.0 (systems). Thus, FIG. 11 illustrates the presentation override controls being included in a service information packet of an MPEG-2 transport stream. It will be understood that various combinations and subcombinations of these and/or other presentation override controls may be used.

Figure 12:
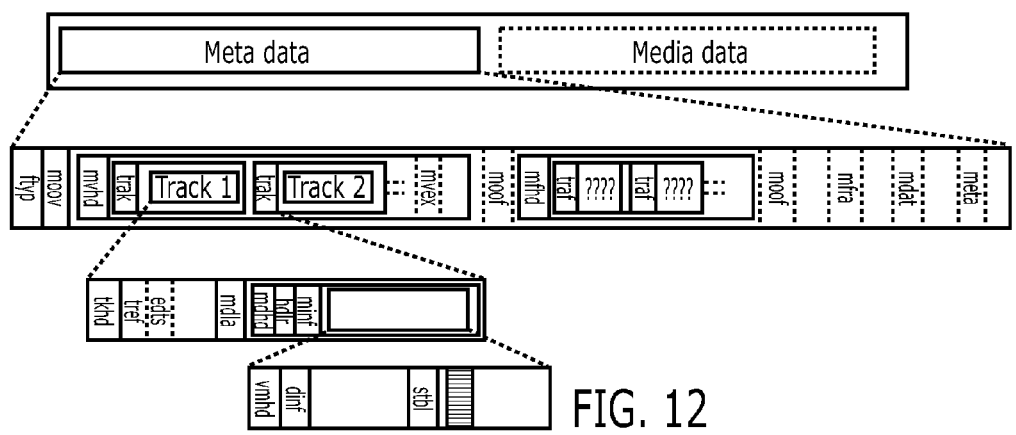
FIG. 12 illustrates a Moving Picture Expert Group-4 (MPEG-4) file format that includes presentation override controls according to various embodiments described herein.

FIG. 12 illustrates an ISO standard implementation according to ISO IEC 14496-14, Information Technology—Coding of Audio-Visual Objects, Part 14: MP4 file format. ISO is the container format (ISO base media file format) for non-transport stream content delivery specified in ISO IEC 14496-12 (Information Technology—Coding of Audio-Visual Objects, Part 12: ISO base media file format) which is then extended to be the MP4 file format in ISO IEC 14496-14. The MP4 file format inherits all capabilities of the ISO base media file format and adds some additional characteristics which are not significant to various embodiments described herein. The MP4 file format is included in various embodiments described herein as it is the dominant container method for content that is delivered via broadband mechanisms. The presentation restrictions would be included in an information box within Video Media Header (vmhd) as defined in ISO IEC 14496-12 and shown in FIG. 12 as a hatched box. The format of the presentation controls in this new box is not yet defined, but could be similar in construction to that shown in FIG. 7. The presentation restrictions may be included at other locations in other embodiments. It will be understood that various combinations and subcombinations of these and/or other presentation override controls may be used.

Figure 13:
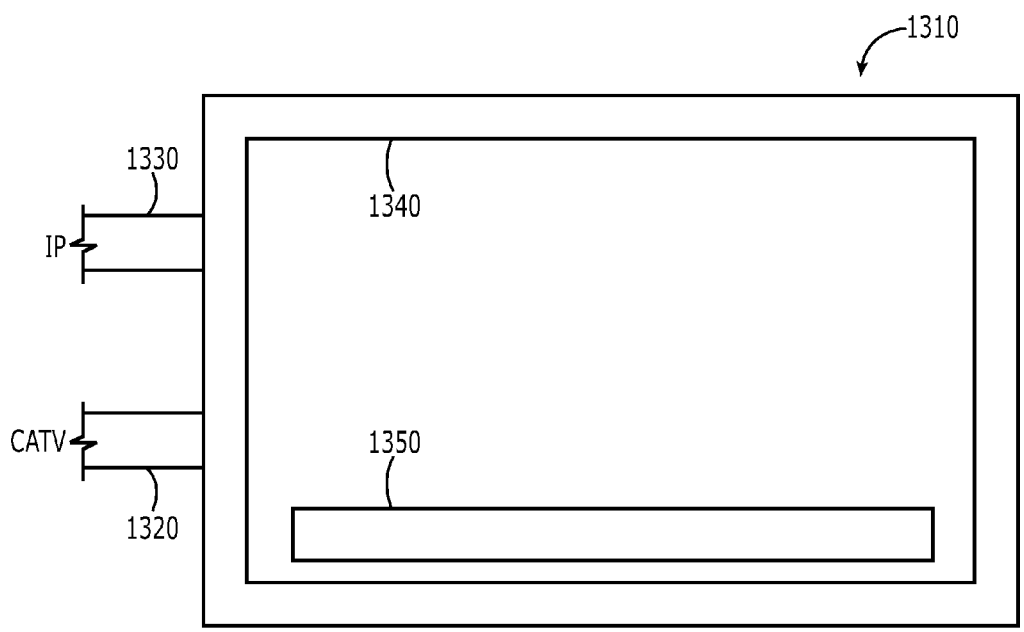
FIG. 13 illustrates a smart TV including presentation override controls according to various embodiments described herein.

FIG. 13 illustrates a specific implementation of various embodiments described herein, wherein a smart TV 1310 receives cable television (CATV) programming via a cable connection 1320, and receives applications via an Internet Protocol (IP) connection 1330. The CATV content is displayed in an area 1340 of the display and data produced by the applications 1330 may be displayed in a smaller area 1350 that is governed by presentation override controls according to various embodiments described herein. Generators and/or owners of content may thereby control the presentation of their content on a presentation device, notwithstanding the concurrent presentation of data from applications that are also executing on the smart TV 1310. Thus, even though the content provider delivers the content to the smart TV 1310 via a broadcasting system, and the smart TV also includes applications concurrently running thereon, the content provider or owner may still have basic control over the presentation format of the content, and can override contradictory presentation controls by an application. Corruption of the content may thereby be reduced or minimized. For example, an overlay, a pop-up content, scaling and/or audio that is produced by an application may be prevented from unduly corrupting the creative content. The user may pause the playback of the content, to thereby allow the presentation requests by the application to be fully implemented. However, while the content is being played, presentation override controls may be implemented.

In embodiments of FIG. 13, in-band presentation override controls may be delivered over the cable connection 1320 along with the CATV programming. Out-of-band controls may be delivered over the cable connection 1320 separate from the CATV programming, for example during the middle of the night, and/or via the IP connection 1330.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will frilly convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exeinpli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices), signal formats and/or computer program products. It is understood that a block of the block diagrams and/or flowchart illustrations, and combinations of blocks in the block diagrams and/or flowchart illustrations, can be implemented by computer program instructions that are performed by processor circuitry. These computer program instructions may be provided to processor circuitry of a general purpose computer circuit, special purpose computer circuit such as a digital processor, and/or other programmable data processor circuit to produce a machine, such that the instructions, which execute via the processor circuitry of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium for a computer program product or a signal may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "processor circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination. In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A video content presentation terminal, comprising:
    a video content receiver that is configured to receive video content and presentation override controls for the video content, the presentation override controls defining presentation restrictions for the video content;
    an applications processor that is configured to execute applications on the video content presentation terminal, the applications including presentation format requests; and
    a controller that is responsive to the video content receiver and the applications processor and that is configured to format the video content that was received for presentation on a content presentation device according to the presentation override controls that were received, while preventing implementation of the presentation format requests that are made by the applications that are executing on the video content presentation terminal that are inconsistent with the presentation override controls.

2. A video content presentation terminal according to claim 1 wherein the video content receiver is configured to receive the video content and the presentation override controls for the video content in an in-band field of the video content.

3. A video content presentation terminal according to claim 1 wherein the presentation override controls comprise:
    an identification of a minimum percentage to which the video content can be scaled on the video presentation device;
    an identification of an absolute scaling percentage to which the video content can be scaled on the video presentation device;
    an identification of a permitted region of the video presentation device on which the applications can overlay applications graphics or content;
    an identification of a color that cannot be used on the content presentation device to present applications graphics or content in regions made available on the content presentation device; and/or
    an identification of a level of audio that can be mixed into an audio output of the content presentation device.

4. A video content presentation terminal according to claim 1 wherein the video content receiver is configured to receive the presentation override controls in a presentation override control field that accompanies the video content, and wherein the controller is further configured to ignore presentation format requests that are made by the applications that are executing on the video content presentation terminal when the presentation control field does not contain a presentation override control.

5. A video content presentation terminal according to claim 1 wherein the presentation override controls comprise:
    an identification of a minimum scale factor;
    an identification of a number of scale factors;
    an identification of an allowed scale;
    an identification of a number of overlay regions;
    an identification of an overlay region horizontal position;
    an identification of an overlay region horizontal size;
    an identification of an overlay region vertical position;
    an identification of an overlay region vertical size;
    an identification of a number of denied colors for an overlay region;
    an identification of a designation of a denied color in an overlay region; and/or
    an identification of a maximum audio mixing level;
    for presentation of the content that was received on the content presentation device.

6. A video content presentation terminal according to claim 1 in combination with the content presentation device.

7. A video content broadcast system, comprising:
    a video content receiver that is configured to receive video content and presentation override controls for the video content, the presentation override controls defining presentation restrictions for presentation of the video content on a content presentation device, while preventing implementation of presentation format requests that are made by applications that are executing on a video content presentation terminal that is associated with the content presentation device, that are inconsistent with the presentation override controls; and a video content broadcaster that is configured to broadcast the video content and the presentation override controls for the video content.

8. A video content broadcast system according to claim 7 wherein the video content broadcaster is configured to broadcast the video content and the presentation override controls for the video content in an in-band field of the video content.

9. A video content broadcast system according to claim 7 wherein the presentation override controls comprise:
   an identification of a minimum percentage to which the video content can be scaled on the video presentation device;
   an identification of an absolute scaling percentage to which the video content can be scaled on the video presentation device;
   an identification of a permitted region of the video presentation device on which the applications can overlay applications graphics or content;
   an identification of a color that cannot be used on the content presentation device to present applications graphics or content in regions made available on the content presentation device; and/or
   an identification of a level of audio that can be mixed into an audio output of the content presentation device.

10. A video content broadcast system according to claim 7 wherein the video content receiver is configured to receive the presentation override controls in a presentation override control field that accompanies the video content, and wherein the presentation control field does not contain a presentation override control for some of the video content that is received.

11. A video content broadcast system according to claim 7 wherein the presentation override controls comprise:
   an identification of a minimum scale factor;
   an identification of a number of scale factors;
   an identification of an allowed scale;
   an identification of a number of overlay regions;
   an identification of an overlay region horizontal position;
   an identification of an overlay region horizontal size;
   an identification of an overlay region vertical size;
   an identification of an overlay region vertical position;
   an identification of a number of denied colors for an overlay region;
   an identification of a designation of a denied color in an overlay region; and/or
   an identification of a maximum audio mixing level;
for presentation of the content that was received on the content presentation device.

12. A non-transitory computer-readable medium containing a video content broadcast signal, the video content broadcast signal comprising video content and presentation override controls for the video content, the presentation override controls defining presentation restrictions for presentation of the video content on a content presentation device, while preventing implementation of presentation format requests that are made by applications that are executing on a video content presentation terminal that is associated with the content presentation device, that are inconsistent with the presentation override controls.

13. A non-transitory computer-readable medium according to claim 12 wherein the presentation override controls are included in an in-band field of the video content.

14. A non-transitory computer-readable medium according to claim 12 wherein the presentation override controls comprise:
   an identification of a minimum percentage to which the video content can be scaled on the video presentation device;
   an identification of an absolute scaling percentage to which the video content can be scaled on the video presentation device;
   an identification of a permitted region of the video presentation device on which the applications can overlay applications graphics or content;
   an identification of a color that cannot be used on the content presentation device to present applications graphics or content in regions made available on the content presentation device; and/or
   an identification of a level of audio that can be mixed into an audio output of the content presentation device.

15. A non-transitory computer-readable medium according to claim 12 wherein the presentation control field does not contain a presentation override control for some of the video content that is received.

16. A non-transitory computer-readable medium according to claim 12 wherein the presentation override controls comprise:
   an identification of a minimum scale factor;
   an identification of a number of scale factors;
   an identification of an allowed scale;
   an identification of a number of overlay regions;
   an identification of an overlay region horizontal position;
   an identification of an overlay region horizontal size;
   an identification of an overlay region vertical size;
   an identification of an overlay region vertical position;
   an identification of a number of denied colors for an overlay region;
   an identification of a designation of a denied color in an overlay region; and/or
   an identification of a maximum audio mixing level;
for presentation of the content that was received on the content presentation device.

17. A video content presentation method, comprising:
   receiving, by a processor, video content and presentation override controls for the video content, the presentation override controls defining presentation restrictions for the video content;
   executing, by a processor, applications including presentation format requests; and
   formatting, by a processor, the content that was received for presentation on a content presentation device according to the presentation override controls that were received, while preventing implementation of the presentation format requests that are made by the applications that are inconsistent with the presentation override controls.

* * * * *